United States Patent [19]

Yarwood et al.

[11] 4,235,224

[45] Nov. 25, 1980

[54] SOLAR HEAT COLLECTOR BLOCK

[76] Inventors: Peter H. Yarwood, 910 E. Sayles Dr., Palatine, Ill. 60067; Arthur J. Czajkowski, 1807 Victoria St.; Edward R. Bunk, 1018 Argonne Dr., both of North Chicago, Ill. 60064

[21] Appl. No.: 944,181

[22] Filed: Sep. 20, 1978

[51] Int. Cl.³ .............................................. F24J 3/02
[52] U.S. Cl. .................................................... 126/438
[58] Field of Search .............................. 126/438, 439

[56] References Cited

U.S. PATENT DOCUMENTS

| | | | |
|---|---|---|---|
| 4,003,366 | 1/1977 | Lightfoot | 126/438 |
| 4,132,219 | 1/1979 | Cohen et al. | 126/438 |

FOREIGN PATENT DOCUMENTS 2352260  12/1977  France ..................................... 126/438

*Primary Examiner*—Carroll B. Dority, Jr.
*Attorney, Agent, or Firm*—Kenneth T. Snow

[57] ABSTRACT

A generally rectangular solar heat collector block or module adapted to operate with its narrow side in a generally vertical position. One face of the collector block is adapted to receive direct sun rays. The ray receiving face having a reflector surface commencing at a position closely adjacent the front and top of the block and terminating adjacent the rear and bottom of the block. A duct is disposed transversely in the bottom of the block and has a depth substantially coextensive with the depth of the block. Insulation is provided in the block rearwardly of the reflector surface. The reflector surface comprises a plurality of adjoining, different angled reflective surfaces which are arranged and constructed to dispense reflected sun heat rays substantially uniformly over an extended portion of the full depth of the duct. The module just defined is adapted to be used in multiples and arranged side-by-side and in vertical banks to form a wall panel for collecting solar heat. The individual ducts of each module combine to form a single long duct for carrying the collected heat to any desired area for usage of that heat.

5 Claims, 4 Drawing Figures

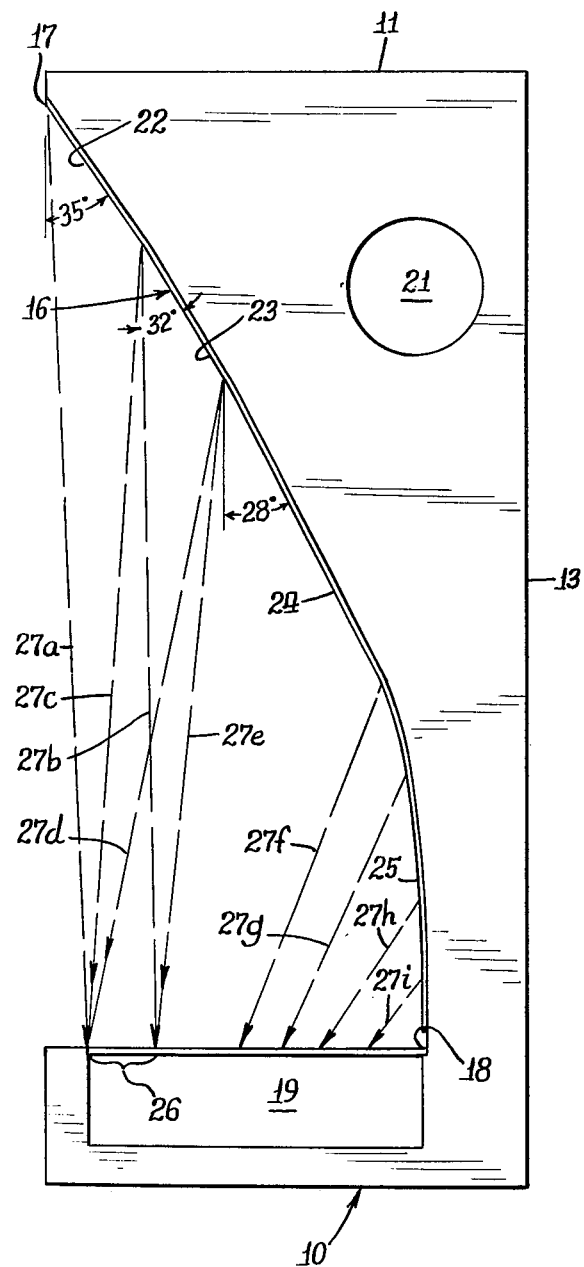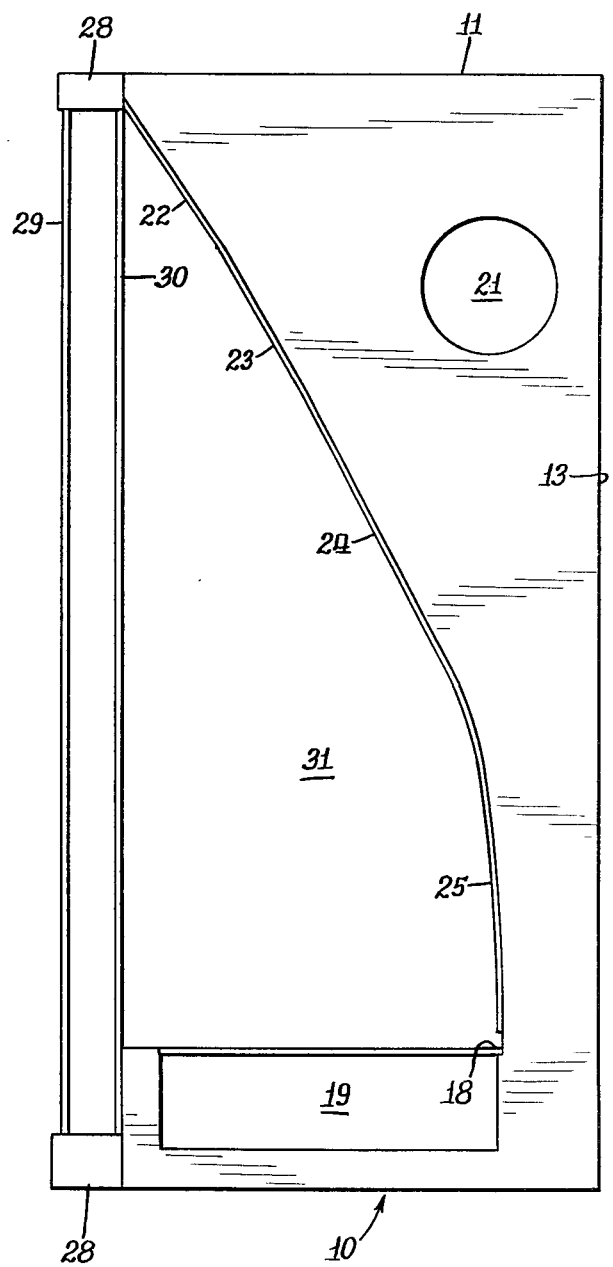

SOLAR HEAT COLLECTOR BLOCK

BACKGROUND OF THE INVENTION

1. Field of the Invention

In recent years the utilization of solar heat has become more pronounced because of diminishing supplies of other forms of energy. Thus the harnessing of the sun's rays and particularly the efficient harnessing is becoming extremely important.

The development of means to collect heat from the sun has taken many forms but in the main are unit panels, cells, or blocks which can be used either singly or in multiples. These unit panels have a sun reflecting surface for the concentration of the rays onto a heat collecting and transferring element. Most of the collector panels of the past have employed reflective surfaces of parabolic curves where the sun's rays are all concentrated on a single point, or at the most a very limited area with attendant high heat. Heat losses tend to be greater when high heats are involved.

The present invention is designed with a reflector surface capable of spreading the sun's rays over a substantial area and at lower temperatures without excessive heat losses to thereby better collect the gathered heat for transmission to the space to be heated.

2. Description of the Prior Art

A search of the prior art has been made and the following U.S. Pat. Nos. were believed to be pertinent relative to applicants' invention of directing and spreading the sun's heat rays over an extended area of the full depth of a heating duct.

Von Brudersdorff—2,859,745
Johnson, Jr.—3,285,333
Wartes—3,884,217
Falbel—3,923,039
Spielberg—3,968,786
Smith—3,974,824
Cheng et al—3,982,527
Rabl—3,991,740
Lightfoot—4,003,366
Fattor—4,015,585
Cohen et al—4,022,188
Parker—4,026,273

All of the above listed U.S. patents are concerned with reflectors designed to concentrate solar radiation on a particular point of a heat collector. Most of them show parabolic curves.

The patent to Fattor U.S. Pat. No. 4,015,585 employs a reflecting surface which focuses solar radiation into a narrow, linear area rather than a single point as done with a true parabolic reflector.

The Falbel patent, U.S. Pat. No. 3,923,039 employs a reflector which looks like a parabolic curve but is composed of curves of different radii and the focusing or concentration of the sun's rays is not delivered to a single point but rather has some spreading.

The Cohen et al patent, U.S. Pat. No. 4,022,188 shows a reflector with a flat portion and a curved portion associated with a duct to be heated.

The Lightfoot patent, U.S. Pat. No. 4,003,366 discloses a reflector in the form of a hyperbolic curve and has a triangularly shaped non-insulated duct to be heated, disposed intermediate the ends of the reflector. Lightfoot distinguishes from applicants' invention which carries a duct to be heated at one end of the reflector surface so that the duct can be and is insulated over the three sides thereof not receiving the sun's reflected rays.

The disclosures discussed herein are all variations on true parabolic curves and hence show some forms of spreading of reflected heat rays. However, no one of them specifically spreads those reflected heat rays uniformly over a substantial portion of the full depth of a duct to carry the heat to its ultimate use.

SUMMARY OF THE INVENTION

A principal object of the present invention is to provide a novel solar heat collector module.

An important object of this invention is to provide a novel collector block for the sun's rays which reflect the received rays uniformly over a substantial portion of the full depth of a duct built into the collector block at one end thereof.

Another important object of this invention is to provide a novel collector block of generally rectangular shape which is adapted to be disposed in a generally vertical position with its narrow side up and a reflector surface therein extending from a position adjacent the top and the front thereof to a position near the bottom and adjacent the rear thereof.

Still another important object of this invention is to provide a novel collector block as established in the preceding object and having a generally rectangularly shaped duct in the bottom thereof and the duct adapted to generally uniformly receive reflected heat rays over an extended portion of its full depth from the front of the block to the rear of the block and this extended portion shiftable transversely across the full depth of the duct in response to the angle of the solar rays received by the reflector as caused by the changing position of the sun throughout the day and throughout the year.

Another and still further important object of this invention is to provide a novel collector block as defined in the preceding two objects and in which the reflector surface comprises adjoining multiple flat surfaces disposed at different angles.

A still further important object of this invention is to provide a novel solar heat block in which the reflector surface and the duct therein are fully insulated over their non-ray receiving surfaces.

Other and further important objects and advantages will become apparent from the disclosures in the following specification and the accompanying drawings.

IN THE DRAWINGS

FIG. 3 is an enlarged side elevational view of the heat collector block of FIGS. 1 and 2.

FIG. 4 is a side elevational view similar to the device shown in FIG. 3 and having a front cover in association therewith.

AS SHOWN IN THE DRAWINGS

Figure 1:
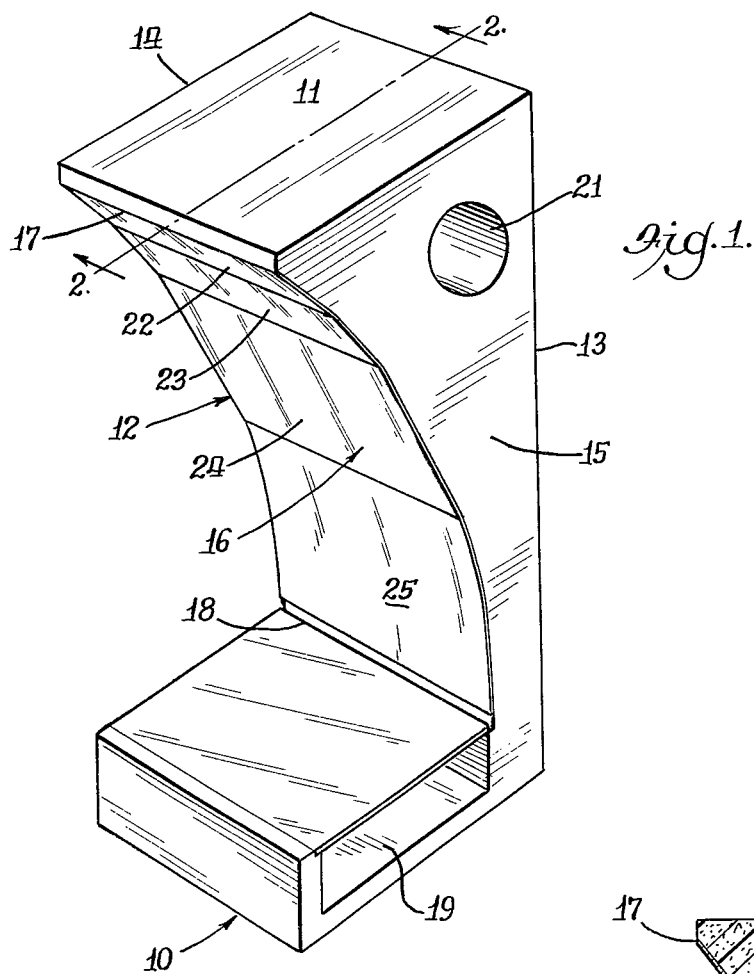
FIG. 1 is a perspective view of the solar heat collector block of this invention.
Figure 2:
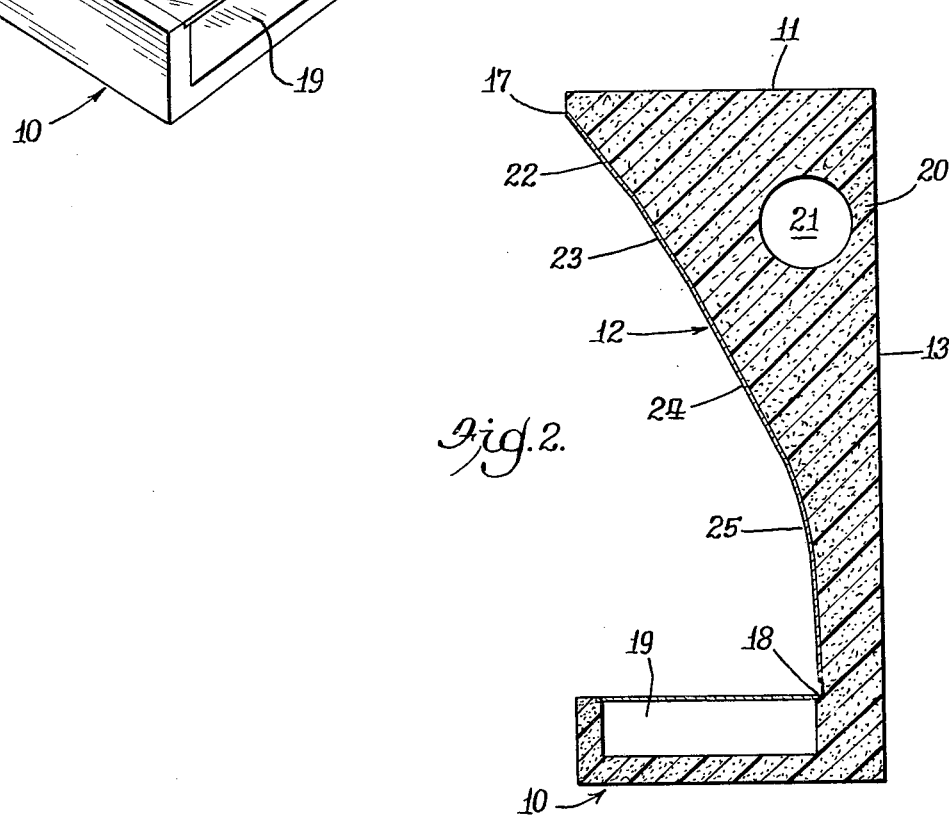
FIG. 2 is a sectional view taken on the line 2—2 of FIG. 1.

The reference numeral 10 indicates generally a base of the solar heat collector block of this invention. The block includes a top 11, a front surface 12, a generally flat rear surface 13, a first side 14 and a laterally spaced apart other side 15. A reflector 16, preferably of thin highly polished metal, is mounted on the front surface 12 of the block or cell and is adapted to receive and transmit the sun's heat rays for useful purposes. The reflector 16 extends from an upper front edge 17 downwardly and rearwardly to a position short of the lower rear edge 18 near the base 10 of the solar heat collector block.

The base 10 houses a transversely disposed duct 19 which is generally of rectangular shape and passes from one side to the other side of the collector block. It is the top of this transverse duct 19 that receives the reflected heat rays of the sun from the reflector 16 to thereby harness the heat received from the sun.

The cell or heat collector block is equipped with an insulation 20 such as a foamed styrene which backs up the generally curved surface of the reflector 16 and surrounds the transverse duct 19 such that there is a minimum or no heat which is permitted to escape from this heat collecting device other than through the duct 19 where the heat is sent for either storage or direct heating of some specified space.

The invention block further includes a hollow passageway 21 which is disposed transversely in the insulation 20. The solar heat collecting block is useable as a single unit or may be used in multiple units where they may be arranged in side-by-side and/or in vertical relationship. One function of the transverse hole or passage 21 is to provide for attaching a plurality of side-by-side arranged collector blocks which may then be arranged on a building such as a house. The unit cells are arranged on the house in an appropriate direction depending upon the geographical location of the house where they are employed. When a plurality of blocks are arranged in multiples the duct 19 then forms a continuous duct from one end to the other of the plural blocks so that if the collected heat is to be utilized it is merely necessary to join the total duct at each end thereof for the transmission of collected heat to a desired area.

As best shown in FIG. 3 the reflector 16 which, as previously stated, is preferably made of highly polished metal comprises a plurality of flat surfaces disposed at different angles with respect to a vertical and adjoining one another to form a continuous reflector surface. The plurality of adjoining flat surfaces act to direct the reflected sun's rays over a substantial extent of the depth of the duct 19. In more detail the reflector 16 comprises a first flat 22 located at its tip. The flat 22 is disposed at an angle of 35° relative to the vertical as shown in FIG. 3. The length or extent of the flat surface is in the order of 3½" for the size of block found to be desirable in harnessing the sun's heat rays. A second adjoining flat surface 23 is provided immediately below the first flat 22. This second flat 23 is disposed at an angle of 32° relative to the vertical. The length or extent of the flat 23 is again in the order of 3½" so that both the first and second flats 22 and 23 are substantially the same in length but are disposed at different angles relative to the vertical. When the different angled flats are joined there is a slight bend line between them rather than a continuous straight line. A third flat surface 24 is disposed immediately beneath and adjoins the second flat surface 23. The length of the third flat surface 24 is substantially in the order of 7.7" so that it is slightly greater than double the length of each of the first and second flat surfaces. Further, the angle of disposition of the third flat surface 24 to the vertical is in the order of 28° rather than the 35° or 32° of the first and second flats respectively. The balance of the reflector 16 from the lower end of the third flat surface 24 to the lower base line 18 is a smooth curved surface 25. The entire effect of the reflector 16 is that of a continuous curve from its upper line 17 to its lower line 18. However, it is in fact composed of a multiple number of flats and an adjoining curved surface.

As previously stated the reflected rays of the reflector impinge upon an extended area of the depth of the transverse duct 19. This extended area is indicated by the numeral 26 and in the construction of the device as shown the depth of the extended area 26 is substantially 2". The total depth of the duct 19 is substantially 9½". Again, in explaining the solar heat collecting block in more detail the effective height or vertical extent of the reflector 16 is substantially 21⅞". The angles of inclination of the adjoining flat surfaces and the remaining curved surface of the reflector have been particularly designed to concentrate the sun's heat rays over a 2" depth 26 of the duct 19. It should be understood that at any given time throughout any given day and throughout the year these reflected rays will impinge on some different 2" depth along the surface of the duct 19. Thus the 2" of receiving depth 26 will not always be in the forward position such as shown in FIG. 3 but will shift as the day and the seasons progress so that the 2" of depth of the receiving of the reflected heat rays will ultimately pass over the full depth of the heating duct 19. The designation of this extended area which receives the reflected sun's heat rays from the reflector 16 are indicated by the arrowed lines 27 which indicate that the heat is not all directed to a single point or line on the duct 19 but rather over this substantially extensive area 26. For example the reflected rays at one given time will be as descriptively shown in the drawings. At this particular time the top edge of the 35° angled reflector surface 22 will cause a reflected ray 27a to impinge on the forward edge of the extended area 26 of the heat duct 19 whereas a reflected ray 27b from the lower inner edge of the flat surface 22 will impinge on the rearward edge of the extended area 26. The sun's rays are also received by the second or next lower flat surface 23 which is disposed at an angle of 32° relative to a vertical. Here a reflected ray 27c commencing at the upper edge of the surface 23 impinges on the forward edge of the extended area 26 and a reflected ray 27d from the lower inner edge of the flat surface 23 impinges on the rearward edge of the extended area 26. Thus all the reflected rays from the flat surfaces 22 and 23 together impinge over the exxtended area 26 to thereupon concentrate the reception of heat to the duct 19 over that particular extended area. The remainder of the reflector 16 is designed to cause rays to be received over the remainder of the top surface of the duct 19. Here the flat portion 24 disposed at 28° relative to a vertical will cause the reflection of a ray 27e from the upper edge thereof to impinge on the rearward edge of the extended area 26 whereas a reflected ray 27f from the lower edge of that same surface 24 will impinge on the duct 19 substantially midway between its forward and rearward ends. The curved lower portion 25 of the reflector 16 shows reflected rays 27g, 27h and 27i, impinging on and extending substantially across the rear half of the duct 19. Thus all of the duct is receiving heat rays but most of it is concentrated over the forward 2" thereof. In the use of true parabolic surfaced reflectors of this type the heat impingement is all directed to a single line and thus the heat received on the duct is quite high. Heat losses attendant these high concentrated line heats are much greater than in applicants' present device where the heat is spread over a substantial area of the duct and thus is at a somewhat lower temperature. There is a minimum of heat loss in applicants' lower temperature device and a more efficient transfer of the sun's heat rays to the duct which is used to deliver the harnessed heat rays to a space to be heated.

The solar heat block of this invention is preferably formed of molded styrene insulation material 15 and with only a light gauge metal reflector 16 covering the front surface thereof and a light gauge metal on the top surface of the transverse duct 19 the weight of the block is very small. Thus the light weight solar heat collecting block of this invention will not add appreciably to the load that a roof or a wall of a house must carry in order to utilize this type of solar heat.

Applicants' identifying of particular angles of disposition of the adjoining flat surfaces comprising the reflector represent the optimum in the efficient solar heat collector block of this invention. However, both the angles of disposition and the lengths of the flats as identified are not necessarily the only angles and lengths that will function properly in a solar heat collector block. It is urged that in addition to these specific angles and lengths applicants be accorded broad patent protection on the joining of flats in a reflector surface disposed at different angles relative to the vertical and of different lengths to produce a heat collector block which effectively transmits received heat rays to a duct within the block for passage of the collected heat to a space to be heated.

For the most efficient use of the heat collector blocks of this invention a cover or front panel of a material such as glass or plastic should be employed as shown in FIG. 4. The material of the cover should be such as to permit passage of the sun's rays with a minimum of refraction as well as to retain the heat developed within the heat cell. The index of refraction of the cover material and the atmosphere should be as close to identical as reasonably possible. Also, the cover material should have insulating qualities for the purpose of trapping the heat within the block and thus being able to utilize that generated heat. A material found to be acceptable for the front cover panes is known in the trade as a transparent or translucent "KALWALL". This material is manufactured by Kalwall Corp. located in Manchester, N.H. 03103.

It should also be understood that the blocks will be enclosed on their ends when they are in use. The ends have not been shown because they are employed only at each end of a bank of blocks and would likely be put in by the installer. These ends should preferably be an insulating material.

The purpose of the front cover is to enhance the solar heat generating operation by causing the block to produce higher temperatures. As shown in FIG. 4 a frame 28 is provided around the perimeter of a single block or around a plurality of blocks if the blocks are used in multiples. For maximum efficiency two spaced apart panes 29 and 30 are provided in the frame 28. These panes are preferably sealed in the frame 28 to enhance its insulation qualities. By using the cover of FIG. 4 the temperature within the block as indicated by the reference numeral 31 is substantially elevated over the temperature in that same space when a front cover is not employed. The front cover should make the space 31 within the block substantially air tight. However, to avoid any pressure build-up within the block it is preferable to avoid its complete sealing.

The space or gap between the reflector 16 and the top of the duct 19 is desirable to avoid the bridging that would occur if those members where in direct contact. Such touching of these members would cause the temperatures to tend to equalize and would reduce the effectiveness of the subject device.

We are aware that numerous details of construction may be varied throughout a wide range without departing from the principles disclosed herein and we therefore do not propose limiting the patent granted hereon otherwise than as necessitated by the appended claims.

What is claimed is:

1. A solar collector comprising a substantially vertically disposed rectangularly shaped unit formed from a block of rigid insulating material and defining a vertical front, a spaced apart vertical back, a horizontal top and a spaced apart horizontal bottom, the solar collector unit disposed in such a manner that said front receives the direct sun's rays, a sun reflecting surface formed on said insulating material within the front of said unit, said block of material being recessed to form a horizontally disposed duct positioned in the bottom of said unit, means covering the top of said duct and for receiving solar energy said duct extending substantially the full depth of the collector and utilized to receive the sun's heat rays from the reflecting surface formed within the front of said unit, and said sun reflecting surface formed of a plurality of flat surfaces disposed at different angles relative to the vertical front surface and adjoining one another in forming a continuous surface, and a remaining continuously curved surface joining the last of said flat surfaces and extending down to a juncture with the rearward end of the duct, and the angles of said reflecting flat surfaces and the contour of the curved surface being such that the duct receives concentrated reflected sun heat rays over a substantial extent thereof.

2. A device as defined in claim 1 in which said plurality of flat surfaces of said sun reflecting surface being formed of at least three flat surfaces.

3. A device as set forth in claim 2 in which the first or uppermost of the three flat surfaces is disposed at an angle in the order of 35° relative to the vertical, the next of the three flat surfaces is substantially the same length as the first of said flat surfaces and is disposed at an angle in the order of 32° relative to the vertical, and the third or lowermost of the three flat surfaces is substantially twice the length of the first of said flat surfaces and is disposed at an angle in the order of 28° relative to the vertical.

4. A device as set forth in claim 2 in which the first or uppermost of the three flat surfaces is in the order of 3½" in length and has an angle in the order of 35° relative to the vertical, the second or middle of the three flat surfaces is in the order of 3½" in length and has an angle in the order of 32° relative to the vertical, and the third or lowermost of the three flat surfaces being in the order of 77/10" in length and has an angle in the order of 28° relative to the vertical.

5. A device as set forth in claim 1 including a front cover which permits the passage of sun rays with a minimum of refraction and substantially confines generated heat within the solar collector.

* * * * *